UNITED STATES PATENT OFFICE.

THOMAS B. ALLEN, OF NIAGARA FALLS, NEW YORK, ASSIGNOR TO THE CARBORUNDUM COMPANY, OF NIAGARA FALLS, NEW YORK, A CORPORATION OF PENNSYLVANIA.

METHOD OF PRODUCING ABRASIVE COMPOUNDS.

1,087,705.     Specification of Letters Patent.     Patented Feb. 17, 1914.

No Drawing.     Application filed July 3, 1913. Serial No. 777,201.

*To all whom it may concern:*

Be it known that I, THOMAS B. ALLEN, a subject of the King of Great Britain, residing at Niagara Falls, in the county of Niagara and State of New York, have invented a new and useful Improvement in Methods of Producing Abrasive Compounds, of which the following is a full, clear, and exact description.

My invention has relation to a new and useful method for the production of abrasive compounds.

The mineral garnet possesses many properties which render it an efficient abrasive for use in grinding operations, more particularly in the form of abrasive paper and cloth for the grinding and polishing of wood. Attempts have heretofore been made to produce this mineral garnet artificially, but such attempts have largely been unsuccessful due to the fact that in the crystallization of a magma of a composition which is suitable to the formation of garnet, the conditions under which the latter will form are within rather narrow limits of temperature and are very difficult to obtain and maintain. I have, for example, melted together a mixture of one hundred and twenty parts by weight of magnesia; one hundred and twelve parts by weight of alumina; and one hundred and eighty parts by weight of silica. This molten mixture is of the theoretical composition of magnesium aluminum garnet, viz., $$3MgO.Al_2O_3.3SiO_2.$$

I discovered that on cooling this material under proper conditions, the garnet crystallizes out, except at the outside of the mass, where too sudden cooling prevents the formation of garnet and where a glass or slag is formed. I have further discovered, however, that the garnet so formed can again dissociate in accordance with the following chemical equation:

$$3MgO.Al_2O_3.3SiO_2 = 2MgO.SiO2 + MgO.Al_2O_3.SiO_2$$

that is, artificial enstatite and a monoclinic aluminous pyroxene are formed. A satisfactory proof of the formation and dissociation of the artificial garnet is that good material remains in a stable massive form, whereas garnet that has been dissociated into enstatite and pyroxene is not stable, but is extremely friable and tends to disintegrate.

I have further discovered that the conditions necessary to the maximum and satisfactory production of garnet from a molten magma of substantially the theoretical composition of garnet are that the said molten magma be first maintained at a temperature which is suitable to the formation of the garnet and then that the solid mass be quickly cooled to prevent dissociation of the garnet.

In carrying out my invention, I can apply it to the production of any forms of garnet which have the generic mineralogical formula of $$3R'O.R''_2O_3.3S_1O_2,$$

in which $R'$ is calcium, magnesium and ferrous iron, and $R''$ is aluminum, ferric iron and chromium. I prefer, however, to form the magnesium aluminum garnet because this can be done with inexpensive materials, it can be readily made, and it has very satisfactory physical properties. Furthermore, the magnesium in a molten magma has strong crystallizing properties. Magnesium aluminum silicate can be melted in a regular double or single arc furnace without change, whereas it is impossible to melt mixtures containing lime, iron, chromium, etc., without reduction, unless the heating is effected by radiation. This is expensive and unsatisfactory.

The following may be given as one specific way of carrying out my invention: I preferably take a mixture having the following proportions, viz., calcined magnesia, 2240 pounds; alumina, 1493 pounds; silica, 2760 pounds. These materials are finely ground and then intimately mixed together. The mixture is then melted, preferably in a furnace of the type shown in the United States patent to Frank J. Tone, No. 1,002,608. The mixture is gradually fed into the furnace until the whole is in a molten condition. It is then carefully insulated by a charge mixture, so that it will cool slowly until it reaches a solid condition. As soon as the mass or ingot is solid, it is removed from the furnace, while still at a temperature of from 1200° to 1500° C. It is then crushed into small pieces in the presence of water, thereby producing a very rapid lowering of the temperature and preventing dissociation of the garnet.

I do not desire to limit myself to the exact proportions stated, since these may be varied somewhat, and as above stated, the invention is applicable to other forms of garnet. Any other suitable form of furnace may be used for melting the mixture.

I claim:

1. The method of producing garnet, which consists in forming a molten magma having substantially the theoretical composition of garnet, allowing the molten mass to cool slowly to permit the crystallization of the garnet, and then cooling said mass quickly to prevent dissociation of the garnet.

2. The method of producing garnet, which consists in melting together a charge mixture to form a molten magma of substantially the theoretical composition of garnet, retarding the cooling of the charge mixture until it is in a solid condition, and then cooling the solid mass quickly to prevent dissociation of the garnet.

3. The method of producing garnet, which consists in introducing a charge mixture into a furnace and melting it therein to form a molten magma which has substantially the theoretical composition of garnet, allowing the molten mass to cool slowly in the furnace to permit the crystallization of the garnet, and then removing the mass from the furnace while it is still at a relatively high temperature and quickly cooling it.

4. The method of producing garnet, which consists in introducing a charge mixture into a furnace and melting it therein to form a molten magma which has substantially the theoretical composition of garnet, allowing the molten mass to cool slowly in the furnace to permit crystallization of the garnet, then removing the mass from the furnace while it is still at a relatively high temperature, and then crushing the mass into small pieces in the presence of water.

5. The method of producing garnet, which consists in taking a mixture of magnesia, alumina and silica of the proper proportions to form when melted a magma of substantially the theoretical composition of garnet, feeding the mixture into the furnace and melting it, then slowly cooling the molten mass until it reaches a solid condition, then removing it from the furnace while still heated, and finally crushing it into small pieces in the presence of water.

In testimony whereof, I have hereunto set my hand.

THOS. B. ALLEN.

Witnesses:
C. J. BROCKBAND,
L. B. COULTER.